United States Patent

Nanba et al.

[11] Patent Number: 5,285,959
[45] Date of Patent: Feb. 15, 1994

[54] AIR HEATING APPARATUS

[75] Inventors: Masayuki Nanba; Yoshikazu Matsuda, both of Sakurai; Akio Taki, Shiki; Takashi Nishikawa, Tenri; Hiroshi Ishihara, Yamatokoriyama; Masao Yoshikawa, Katano; Mitsuharu Tomioka, Kashihara, all of Japan

[73] Assignee: Matsushita Electric Industrial co., Ltd., Osaka, Japan

[21] Appl. No.: 883,120

[22] Filed: May 14, 1992

[30] Foreign Application Priority Data

| May 16, 1991 | [JP] | Japan | 3-111567 |
| May 16, 1991 | [JP] | Japan | 3-111570 |
| Jun. 3, 1991 | [JP] | Japan | 3-131366 |

[51] Int. Cl.[5] .............................. F23N 5/00
[52] U.S. Cl. .................... 236/11; 236/78 D; 236/91 C; 236/91 B
[58] Field of Search ............. 236/11, 10, 78 D, 91 R, 236/91 C, 91 B; 62/161, 163, 213; 395/21, 61, 900, 903

[56] References Cited

U.S. PATENT DOCUMENTS

| 4,697,430 | 10/1987 | Toyoda et al. | 236/91 C |
| 4,793,553 | 12/1988 | Berman | 236/91 R |
| 4,914,924 | 4/1990 | Takahashi | 62/133 |
| 5,046,019 | 9/1991 | Basehore | 395/900 |

FOREIGN PATENT DOCUMENTS 1-208643 8/1989 Japan.

OTHER PUBLICATIONS

Bavarian, B. "Introduction to Neural Networks for Intelligent Control", IEEE Control Systems Mag., Apr. 1988.

Primary Examiner—Harry B. Tanner
Attorney, Agent, or Firm—Wenderoth, Lind & Ponack

[57] ABSTRACT

An air heating apparatus such as a fan heater, a forced circulation type ware air heater, and, an air conditioner and heater, is operated while the amount of radiation is taken into consideration. Moreover, after a PMV value of the room to be heated is generated from the temperature, amount of radiation, etc. of the room to be heated, the burning amount, air flow and the like are controlled to make the PMV value 0.

27 Claims, 18 Drawing Sheets

AIR HEATING APPARATUS

BACKGROUND OF THE INVENTION

1. Field of the Invention

The present invention relates to an air heating apparatus such as a fan heater, a warm air heater of forced circulation type, an air conditioner/heater, etc.

2. Description of the Prior Art

A conventional controlling device for an air heating apparatus has been generally constructed in a manner as indicated in FIG. 18, which will now be described hereinbelow. As shown in the drawing, a temperature setting part 101 is provided for a user to set the temperature inside the room (space to be heated). The temperature inside the room is detected by a room temperature detecting part 102. Outputs from the temperature setting part 101 and room temperature detecting part 102 are input to a burning controlling part 103, to thereby control the operation of a burner part 104 and a convection fan 105. The burner part 104 is constituted of an electromagnetic pump 106 which supplies fuel to a burner (not shown) and a burner fan 107 for feeding air to the burner. The convection fan 105 emits the air heated by the burner as the warm air.

The operation of the controlling device in the above-described structure will be discussed below. When the temperature detected by the room temperature detecting part 102 is considerably lower than the temperature set by the temperature setting part 101, the burning controlling part 103 instructs intensive burning to the burner part 104 and also drives the convection fan 105 with a high rotating frequency. As the room temperature becomes closer to the set temperature, the controlling part 103 weakens the burner part 104 and rotates the convection fan 105 with a lower frequency. In this manner, the room temperature is controlled to a set temperature.

The controlling device of the air heating apparatus of the prior art makes control of the burning level of the burner part 104 and the air flow of the convection fan 105 based on the room temperature alone, without taking into consideration the temperature at the wall surface or floor surface of the space to be heated or the presence/absence of radiant heat like solar heat, etc. Therefore, the room is prone to be too hot or too cold to be comfortable.

Moreover, for making control of the burning level and air flow as mentioned above, the controlling device of the conventional air heating apparatus controls the temperature detected by the room temperature detecting part 102 to be equal to a set temperature of the temperature setting part 101. Therefore, it is difficult to realize the neutral state of thermal balance, that is, a too hot nor too cold state. The conventional controlling device cannot fill the change in the environmental condition.

A great demand has recently arising from the above-described background for an air heating apparatus capable of controlling heating in the balanced state.

SUMMARY OF THE INVENTION

The object of the present invention is therefore to provide an air heating apparatus adapted to offer improved comforts through control of heating in accordance with the state of the space to be heated.

In order to accomplish the aforementioned object, an air heating apparatus of the present invention is provided with a burning part, a room temperature detecting part for detecting the temperature of a space to be heated, namely, room temperature, a radiation detecting part for detecting the amount of radiation from the wall surface or the like of the space to be heated, a convection fan for feeding the warm air into the space to be heated, a burning level setting part which controls the burning level in the burning part and the air flow of the convection fan based on the outputs from the room temperature detecting part and radiation detecting part.

According to a further aspect of the present invention, the air heating apparatus is provided with a burning part, a room temperature detecting part for detecting the room temperature, a radiation detecting part for detecting the amount of radiation from the wall surface or the like of the space to be heated, a convection fan, a PMV operating part which operates a PMV value which is a scale of the degree of comfort of the space to be heated from the burning level of the burning part, outputs of the room temperature detecting part and radiation detecting part and the rotating frequency of the convection fan, and a burning controlling part which controls the burning level in the burning part and the rotating frequency of the convection fan based on the PMV value determined in the PMV operating part.

In the above-described structure, it becomes possible to control heating while taking the amount of radiation into consideration. Moreover, the PMV value (Predicted Mean Vote) of the space to be heated is operated through total learning of the temperature, amount of radiation, air velocity in the space to be heated from the information from the room temperature detecting part, radiation detecting part, convection fan and burner, etc. Therefore, it becomes possible to realize heating which allows almost everyone (not less than 95%) to feel comfortable as the burning level, air flow and the like is so controlled as to make the PMV value 0.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
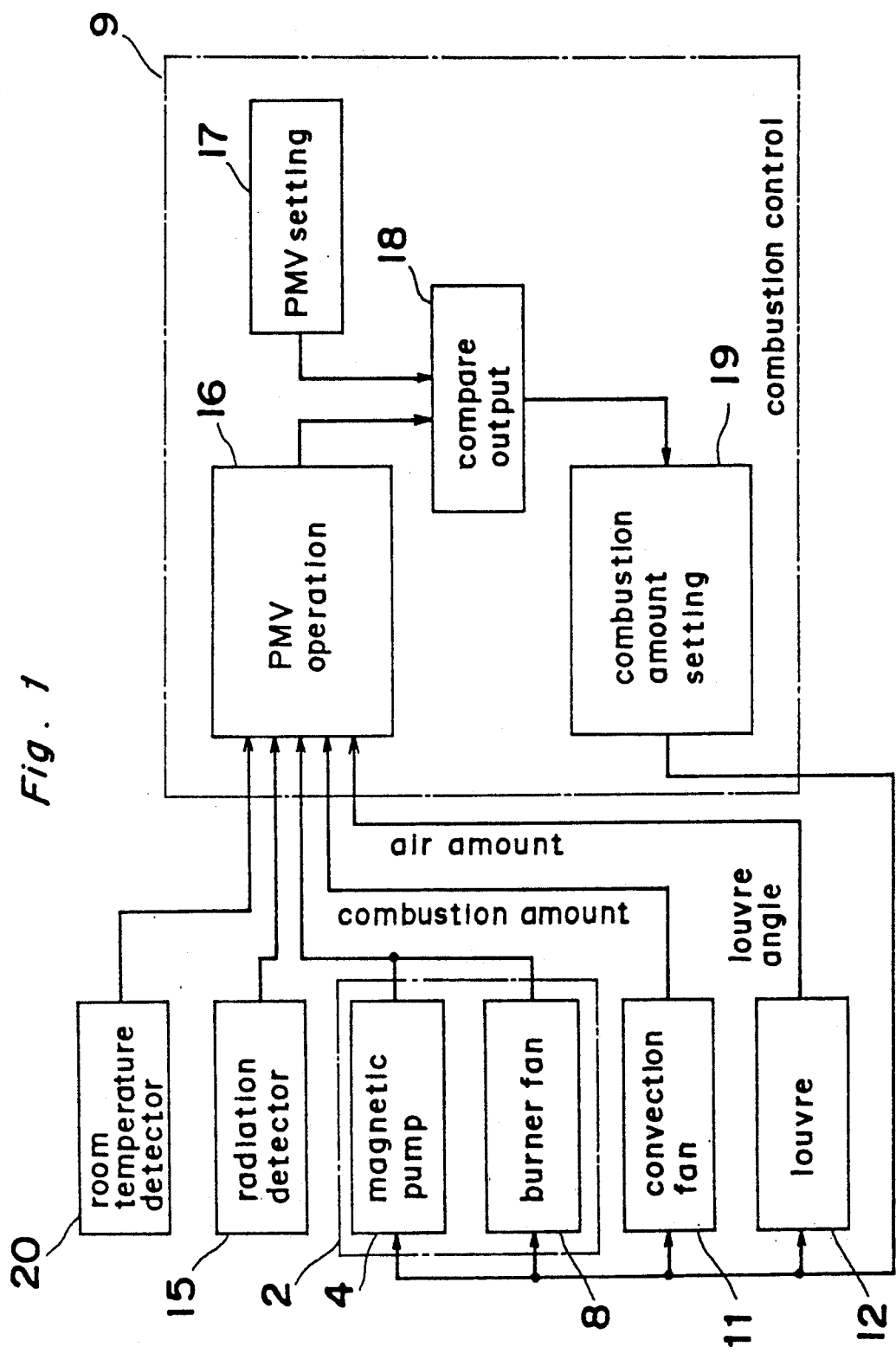
FIG. 1 is a block diagram of a control device of an air heating apparatus according to one preferred embodiment of the present invention.
Figure 2:
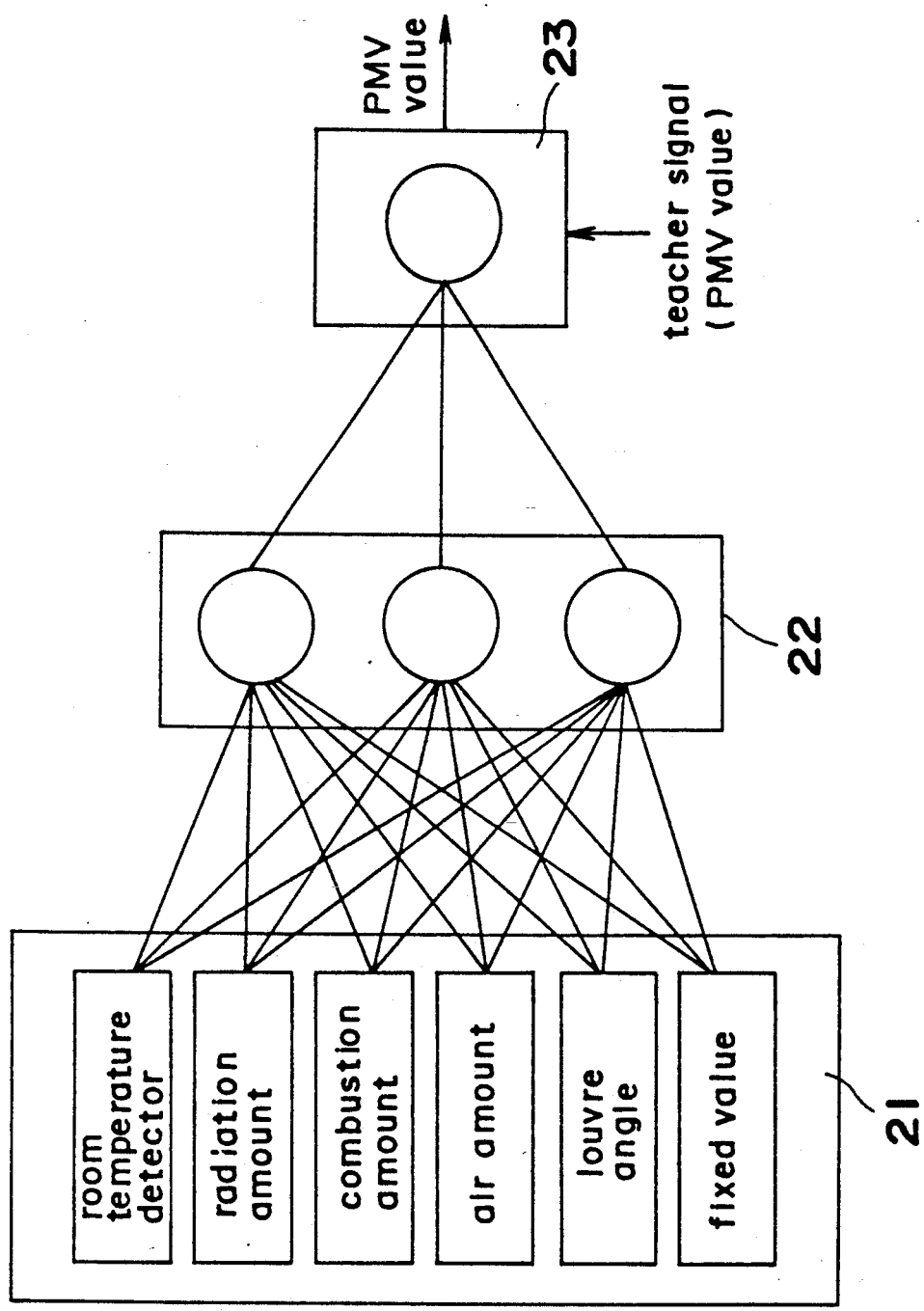
FIG. 2 is a structural diagram of a PMV operating part of the device of FIG. 1.
Figure 3:
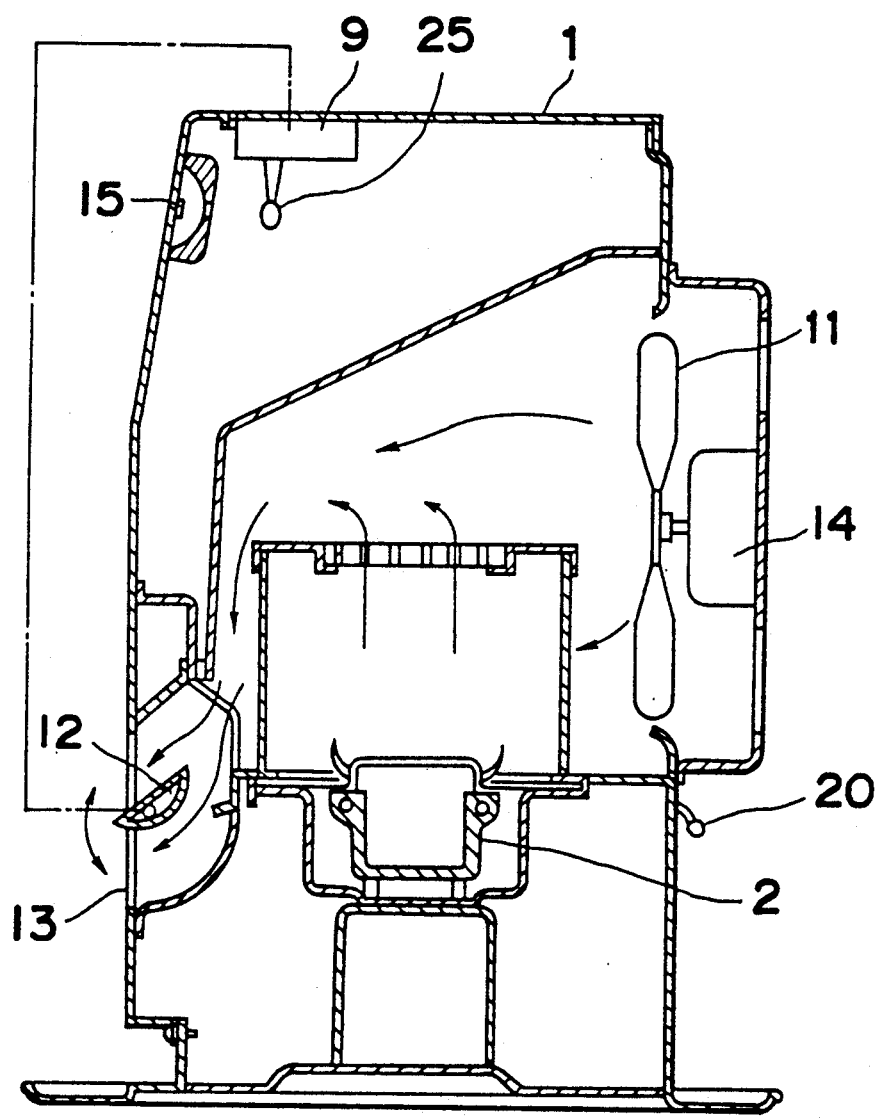
FIG. 3 is a cross sectional view of the air heating apparatus.
Figure 4:
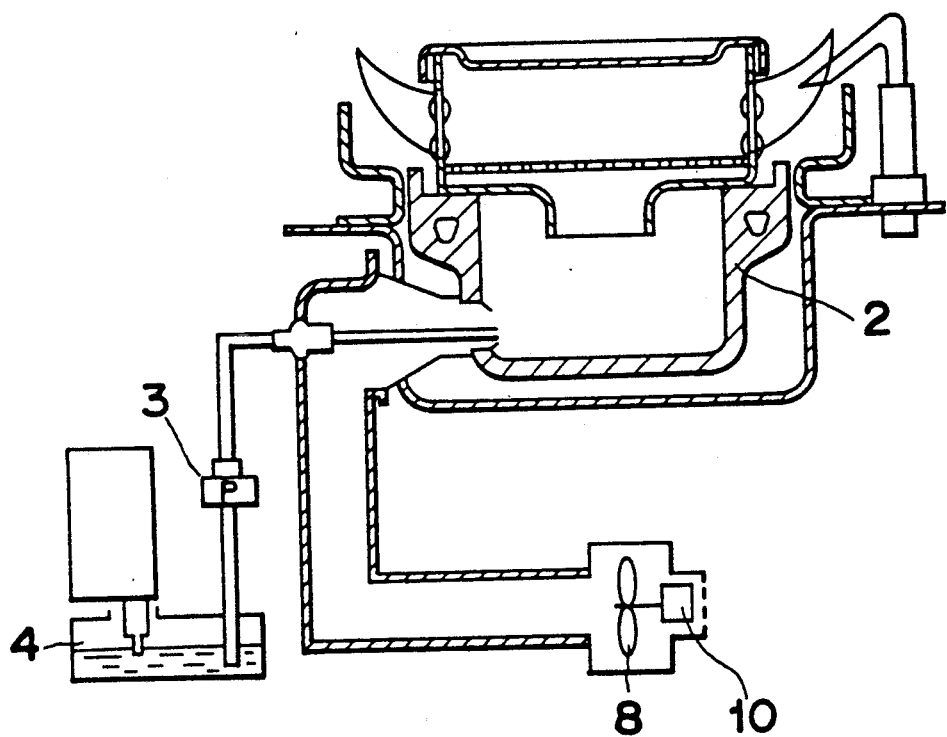
FIG. 4 is a cross sectional view of a burning part of the air heating apparatus.
Figure 5:
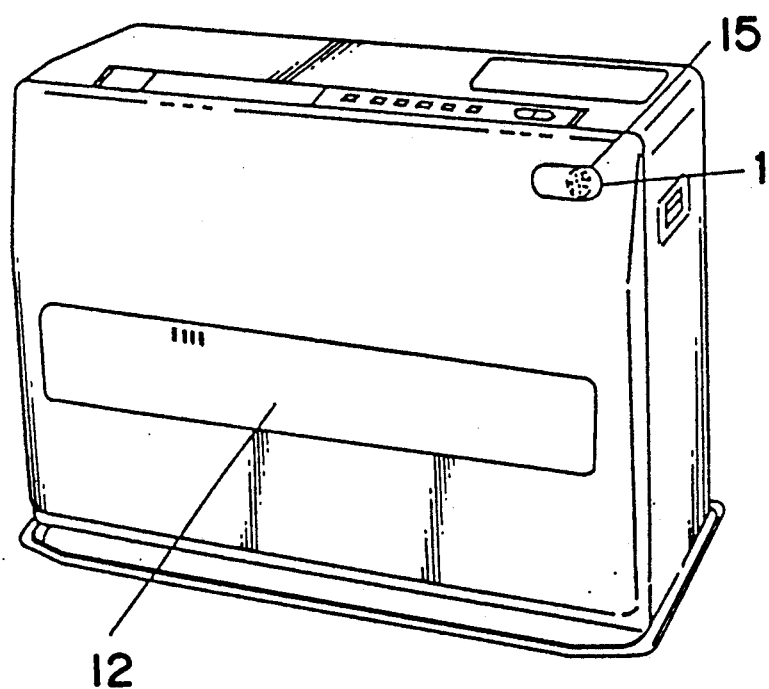
FIG. 5 is a perspective view of the outer appearance of the air heating apparatus.

Before starting the description of a control device of an air heating apparatus according to one preferred embodiment of the present invention referring to FIGS. 1-5, the structure of the air heating apparatus will be depicted with reference to FIGS. 3-5. As shown in FIGS. 3-5, a burning part 2 is provided inside a main body 1 of the air heating apparatus. Fuel (kerosene) in a tank 4 is fed to the burning part 2 by an electromagnetic pump 3. At the same time, a suitable amount of air for combustion is supplied to the burning part 2 by a burner fan 8. In order to control the feeding amount of fuel of the electromagnetic pump 3, the duty ratio of the pulse width impressed to the electromagnetic pump 3 is controlled by an output of a burning controlling part 9. On the other hand, the rotating frequency of a motor 10 is controlled through phase control so as to control the rotating frequency of the burner fan 8. A convection fan 11 is provided in the rear part of the main body 1 to discharge the warm air heated in the burning part 2 through a blow-off port 13. The discharging direction is adjusted by a louver 12. Moreover, the discharging amount of the warm air is controlled through phase control of the rotating frequency of a motor 14 based on the output of the burning controlling part 9 which is mounted at the inner face in the upper part of the main body 1. A radiation detecting part 15 detects the amount of radiation from the wall surface or the like of a space to be heated, and outputs a corresponding a signal to the burning controlling part 9. The radiation detecting part 15 is attached to the inner front face of the main body 1.

FIG. 1 is a block diagram of a control device of the air heating apparatus of the above structure. The burning controlling part 9 consists of a PMV operating part 16, a PMV setting part 17, a comparing/outputting part 18 and a burning level setting part 19. The PMV operating part 16 operates a PMV value based on the inputs from a room temperature detecting part 20, the radiation detecting part 15, the burning part 2, the convection fan 11 and the louver 12, more specifically, based on the room temperature, the amount of radiation, the burning level, the air flow and the angle of the louver. This PMV value is an index established by ISO (International Organization for Standardization) to evaluate the degree of comfort and amenity quantitatively from the temperature, humidity, current of air and amount of radiation surrounding the people, and the volume of clothes and of activity. When the PMV is equal to 0, the thermal balance of one's body is maintained, so that 95% or more of the people feel comfortable. The PMV setting part 17 presets the PMV value to 0 beforehand.

The comparing/outputting part 18 compares the output from the PMV operating part 16 with the output of the PMV setting part 17, and outputs to the burning level setting part 19 a PMV correcting value so that the PMV value from the operating part 16 becomes 0. The burning level setting part 19 controls the burning level in the burning part 2 and the air flow of the convection fan 11 based on the output from the comparing/outputting part 18, and further controls the angle of the louver 12. Values set by the burning level setting part 19 are sent to the PMV operating part 16 through the burning part 2, convection fan 11 and louver 12 as the burning level, air flow and angle of the louver.

As indicated in FIG. 2, the PMV operating part 16 is formed of a neural network in three stages, i.e., an input stage 21, an intermediate stage 22 and an output stage 23. The room temperature, amount of radiation, burning level, air flow, angle of the louver and a fixed value which will be described below are input to the operating part 16. The PMV value is output from the output stage 23 of the operating part 16. In this case, a teacher's signal is input to the output stage 23 for the purpose of learning with use of errors from the predicted PMV value, so that the optimum PMV value corresponding to the inputs is generated. The volume of clothes and activity of a person among the factors determining the PMV value is greatly different depending on age, sex and living environment, etc. and therefore, the factor indicating the volume of clothes and activity including humidities is set to be a fixed value as referred to hereinabove.

Regarding the controlling operation, when the room temperature and the temperature at the wall surface, floor surface or the like in the room are low in the initial stage of driving, the PMV operating part 16 outputs −3 (cold) or −2 (relatively cold). The comparing/outputting part 18 outputs a PMV correcting value to turn the PMV value from the PMV operating part 16 to 0 to the burning level setting part 19. The burning level setting part 19 controls to increase the burning level in the burning part 2 in response to the output from the comparing/outputting part 18. As the degree of comfort in the room is enhanced (e.g., the temperature is raised), the output of the PMV operating part 16 becomes close to 0. The burning level setting part 19 controls the burning level, air flow and angle of the louver, etc. from the output of the comparing/outputting part 18. As a result, comfortable heating is realized.

Correction of the Amount of Radiation

Figure 6:
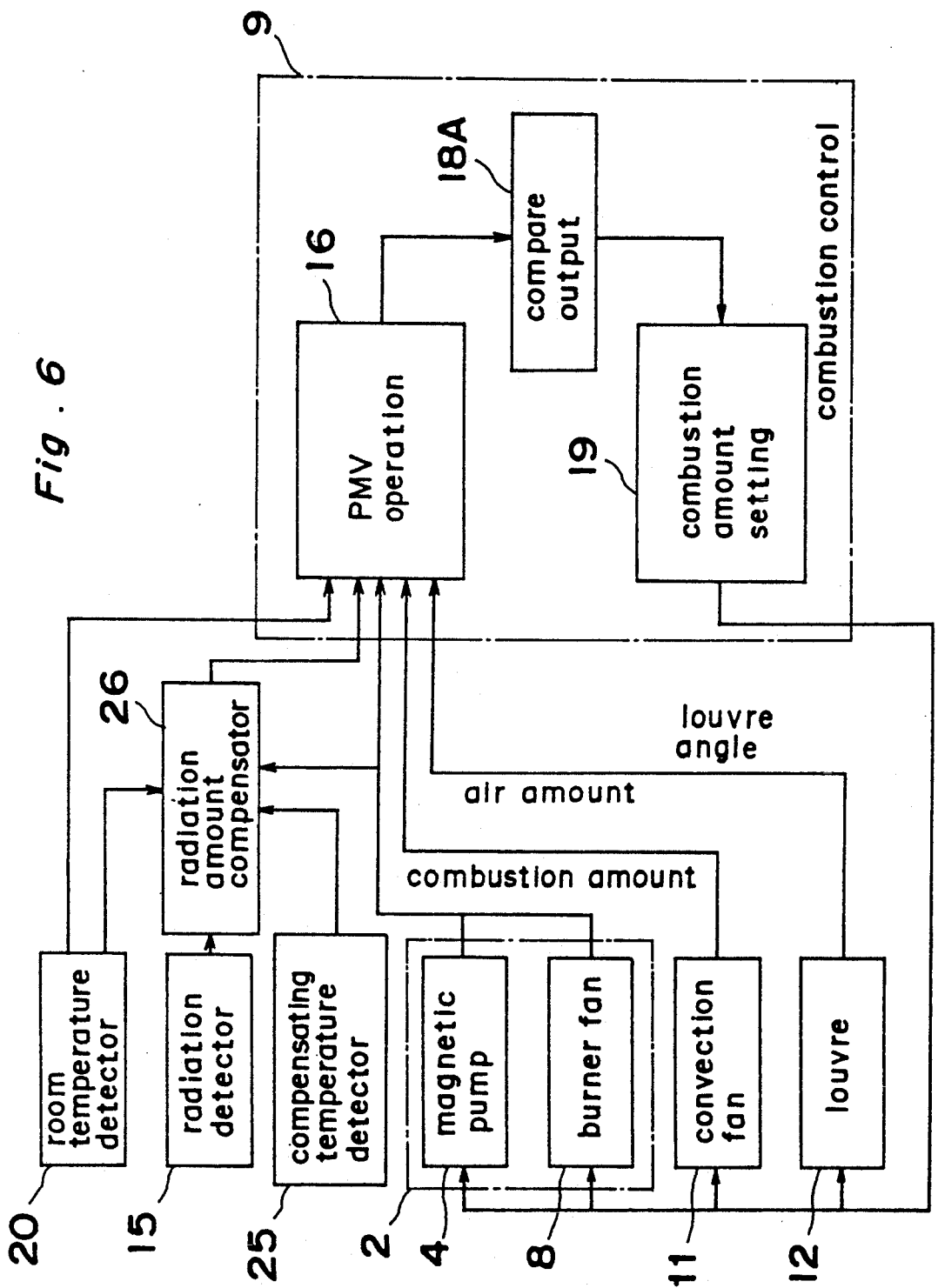
FIGS. 6-9 are block diagrams of a control device of an air heating apparatus according to the other embodiments of the present invention.

FIG. 6 is a structural block diagram of a control device according to a modified embodiment, wherein the amount of radiation from the radiation detecting part is corrected for more accurate control of the air heating apparatus. Not only because the radiation detecting part 15 is influenced by the room temperature, but because burning in the burning part 2 and blowing-off of the warm air cause the temperature rise of the radiation detecting part 15, the detecting accuracy of the amount of radiation is poor in the conventional arrangement of the control device.

The present invention solves the above problem. More specifically, a correcting temperature detecting part 25 comprised of a thermistor detects the temperature in the vicinity of behind the radiation detecting part 15. A radiation amount correcting part 26 corrects the output of the radiation detecting part 15 on the basis of the outputs from the room temperature detecting part 20, correcting temperature detecting part 25 and burning part 2, thereby outputting the true amount of radiation. When the PMV operating part 16 receives inputs of the room temperature from the room temperature detecting part 20, corrected amount of radiation from the radiation amount correcting part 25, burning level of the burning part 2, air flow of the convection fan 11 and angle of the louver 12, it generates the PMV value. A comparing/outputting part 18A having the PMV setting part of FIG. 1 incorporated therein compares the PMV value generated by the operating part 16 with the set value of the PMV setting part, thus sending a predetermined control signal to the burning level setting part 19.

In the embodiment in FIG. 6, the temperature rise in the room subsequent to heating is detected by the room temperature detecting part 20, while the temperature rise in the vicinity of the radiation detecting part 15 is detected by the correcting temperature detecting part 25. Furthermore, the temperature rise resulting from the blown-out warm air is detected as a substitutional characteristic of the burning level. These temperature rises are input to the radiation amount correcting part 26, so that the output of the radiation detecting part 15 is corrected and the true amount of radiation is obtained. Consequently, the PMV operating part 16 operates the PMV value based on the true amount of radiation. The burning level setting part 19 controls the burning level, air flow, angle of the louver and the like so as to make the PMV value from the operating part 16 close to 0. Accordingly, comfortable heating is enabled.

Correction of PMV

Figure 7:
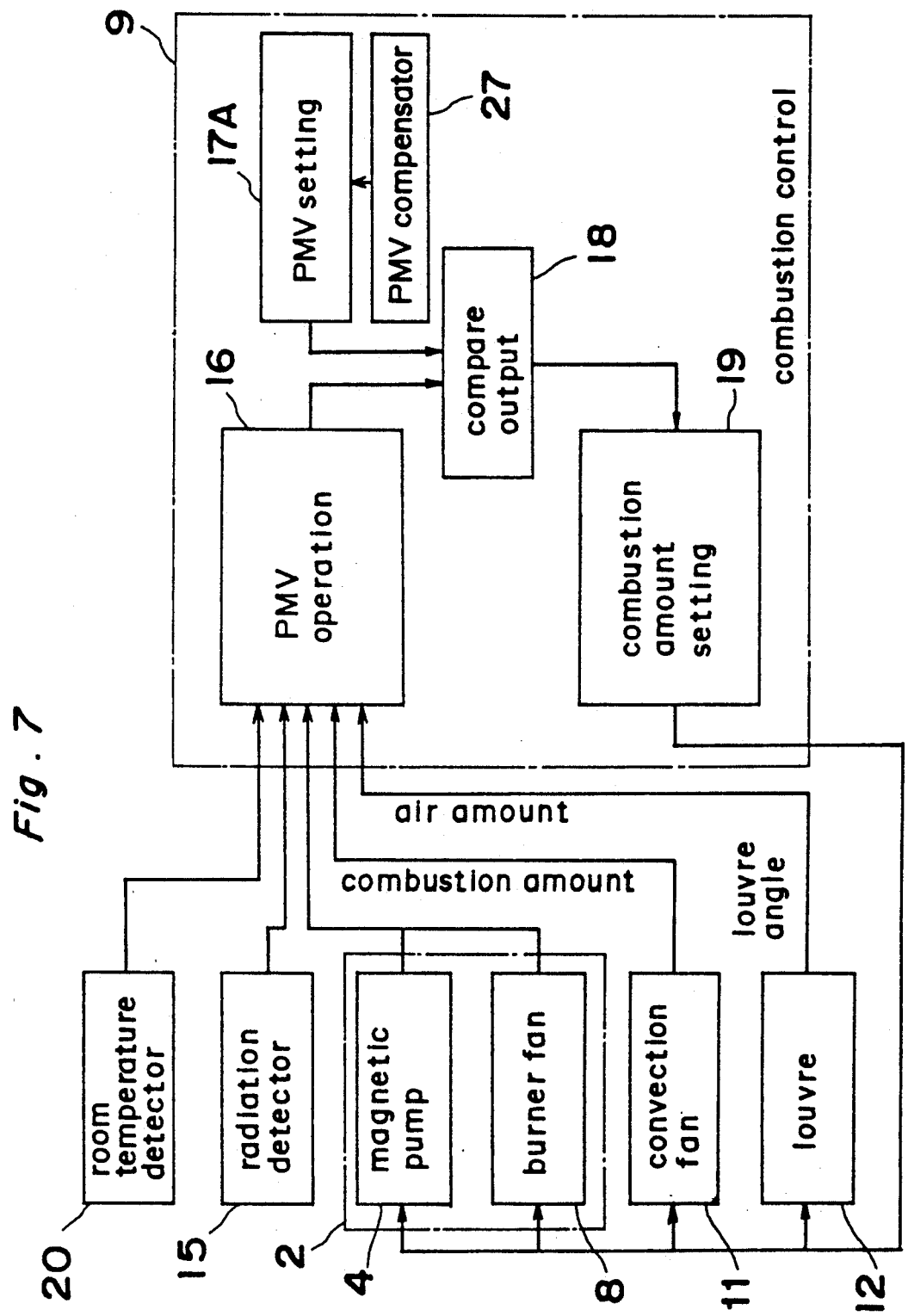

In the structure of FIG. 7, the user can select the user's own desired PMV value. More specifically, a PMV correcting part 27 is provided to correct the PMV value of a PMV setting part 17A which is preset to 0 to be a value slightly inclined to the positive or negative side. For example, the PMV value can be set to $+0.5$ or $-0.5$ by pushing a button of the PMV correcting part 27. Therefore, this arrangement gives the user more comfortable feeling. The comparing/outputting part 18 compares the output of the PMV operating part 16 with the output of the PMV setting part 17A which has been corrected by the PMV correcting part 27, thereby outputting a PMV correcting value which turns the PMV value from the PMV operating part 16 to a set value to the burning level setting part 19. The burning level setting part 19 in turn controls the burning level of the burning part 2 and air flow of the convection fan 11, and further the angle of the louver 12.

According to the arrangement of FIG. 7, in the case where the user does not feel sufficiently comfortable with the PMV value of 0 set by the PMV setting part 17A, the user can correct the set value slightly towards the positive or negative side by depressing the button of the PMV correcting part 27. Accordingly, comfortable heating is realized.

Moderate Driving

When the comparing/outputting parts 18, 18A of FIGS. 6, 7 detect that the PMV value output from the PMV operating part 16 is a positive value other than a predetermined value (for example, not smaller than $+2$), the comparing/outputting parts 18, 18A generate a signal to temporarily stop burning in the burning part 2. If the PMV value from the PMV operating part 16 becomes within the predetermined value, the comparing/outputting parts 18, 18A permit burning again. Therefore, comfortable heating is achieved even with the small heating load.

That is, when the room temperature and the temperature at the wall surface or floor surface, etc. inside the room are low in the initial stage of operation, the output of the PMV operating part 16 assumes $-3$ (cold) or $-2$ (relatively cold), and therefore the comparing/outputting part 18 generates a PMV correcting value to the burning level setting part 19 to change the PMV value from the PMV operating part 16 to 0. In this case, the burning level setting part 19 controls to increase the burning level in the burning part 2. As the room is turned comfortable (e.g., the temperature is raised), the PMV value from the PMV operating part 16 reaches 0, and the burning level setting part 19 controls the burning level, air flow and angle of the louver, etc. to achieve comfortable heating. Heating is continued while the burning level is held minimum afterwards. When the PMV value from the PMV operating part 16 becomes $+2$ (warm) or higher, the comparing/outputting part 18 orders a stop of burning in the burning part 2 through the burning level setting part 19. Thereafter, if the PMV value from the PMV operating part 16 becomes not larger than $-1$ (relatively cool), the burning part 2 starts burning again in response to the output from the comparing/outputting part 18, and the burning level setting part 19 controls the burning level, air flow and angle of the louver to bring the PMV value from the PMV operating part 16 closer to 0. In this manner, comfortable heating is gained.

PMV Lamp

Figure 8:
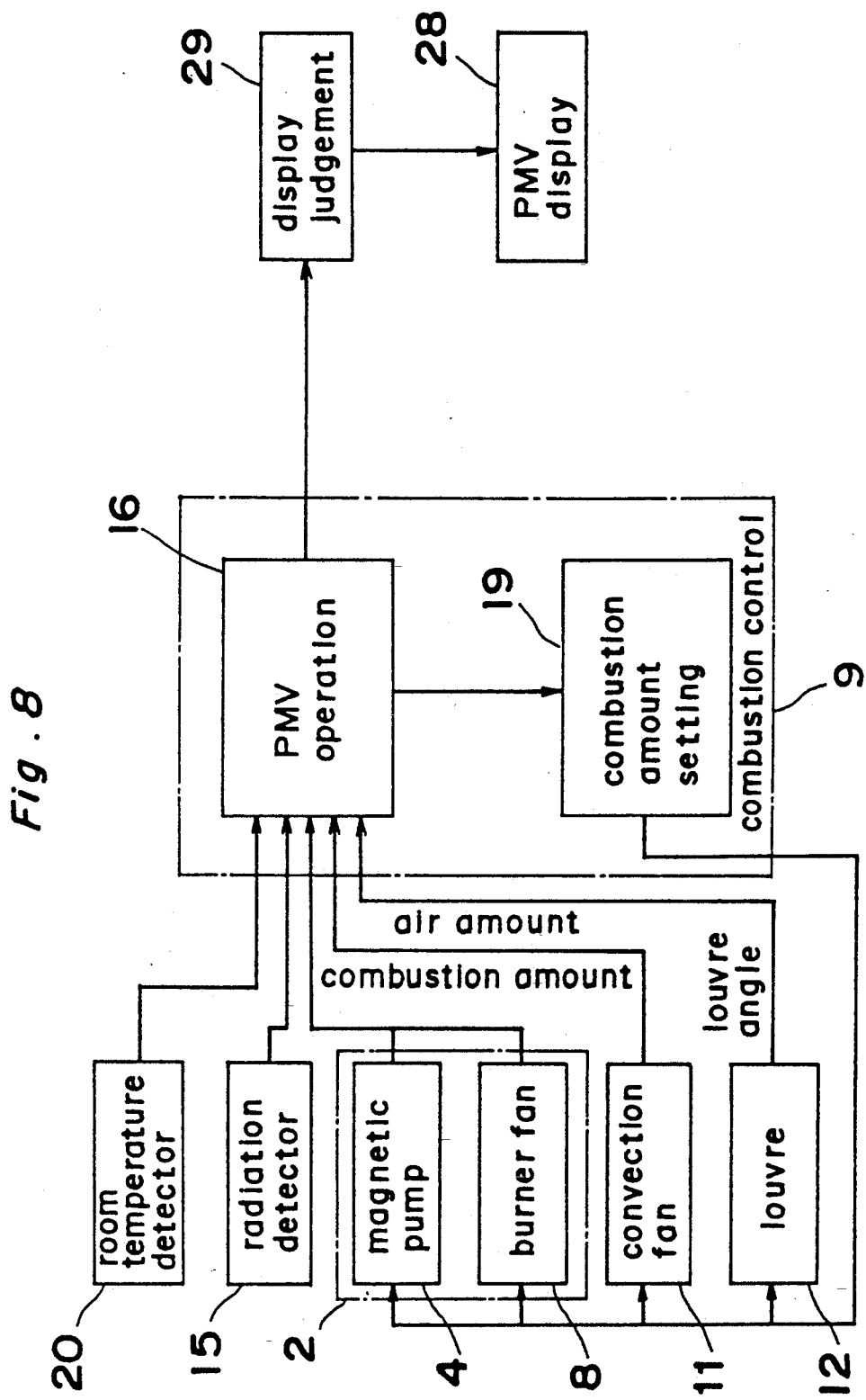

FIG. 8 is a block diagram of a control device adapted to display the comfortable state realized thereby. A PMV display part 28 indicates an output corresponding to an output from a display judging part 29. For instance, the PMV display part 28 is constituted of two LEDs. The display judging part 29 compares the output from the PMV operating part 16 with a predetermined threshold value, and generates an output corresponding to the comparison result to the PMV display part 28.

Therefore, how the air heating apparatus works, that is, the process in which the PMV value approaches the optimum 0 is displayed every moment by the LEDs 1, 2 concurrently with the control of burning in accordance with the PMV value. Referring to Table 1 below, when the PMV value is not higher than the threshold value, i.e., $-2$ indicating that the room is cold at the starting time of heating, the LEDs 1, 2 are not kept ON. As the room is turned a little warmer and the PMV value becomes $-1$, only the LED2 is turned ON to inform the user that the comfortable state is being realized. When the PMV value becomes 0, both the LEDs 1, 2 are turned ON to clearly notify that the room is brought in the comfortable state. Since the burning level is controlled with use of the PMV value, the control device works so as to maintain the state where PMV=0. However, if the PMV value is changed to 1 or 2 as the control device cannot afford to keep the state where PMV=0, the LEDs 1, 2 are gradually turned OFF as shown in Table 1, thereby indicating the user that the comfortable state is lost.

TABLE 1

| PMV value | not larger than −2 | −1 | 0 | 1 | not smaller than 2 |
|---|---|---|---|---|---|
| State of space to be heated | cold | relatively cold | comfortable | relatively hot | hot |
| LED 1 | x | x | o | x | x |
| LED 2 | x | o | o | o | x | o: ON
x: OFF

In the embodiment of FIG. 8, the PMV value is displayed by the LEDs. In place of the LEDs, however, numerical values may be indicated by a liquid crystal display or, color or sound expression may be employed. Although five threshold values are set for the PMV value as above, more or less threshold values may be used, or different kinds of threshold values may be usable.

Fuzzy Inference

Figure 9:
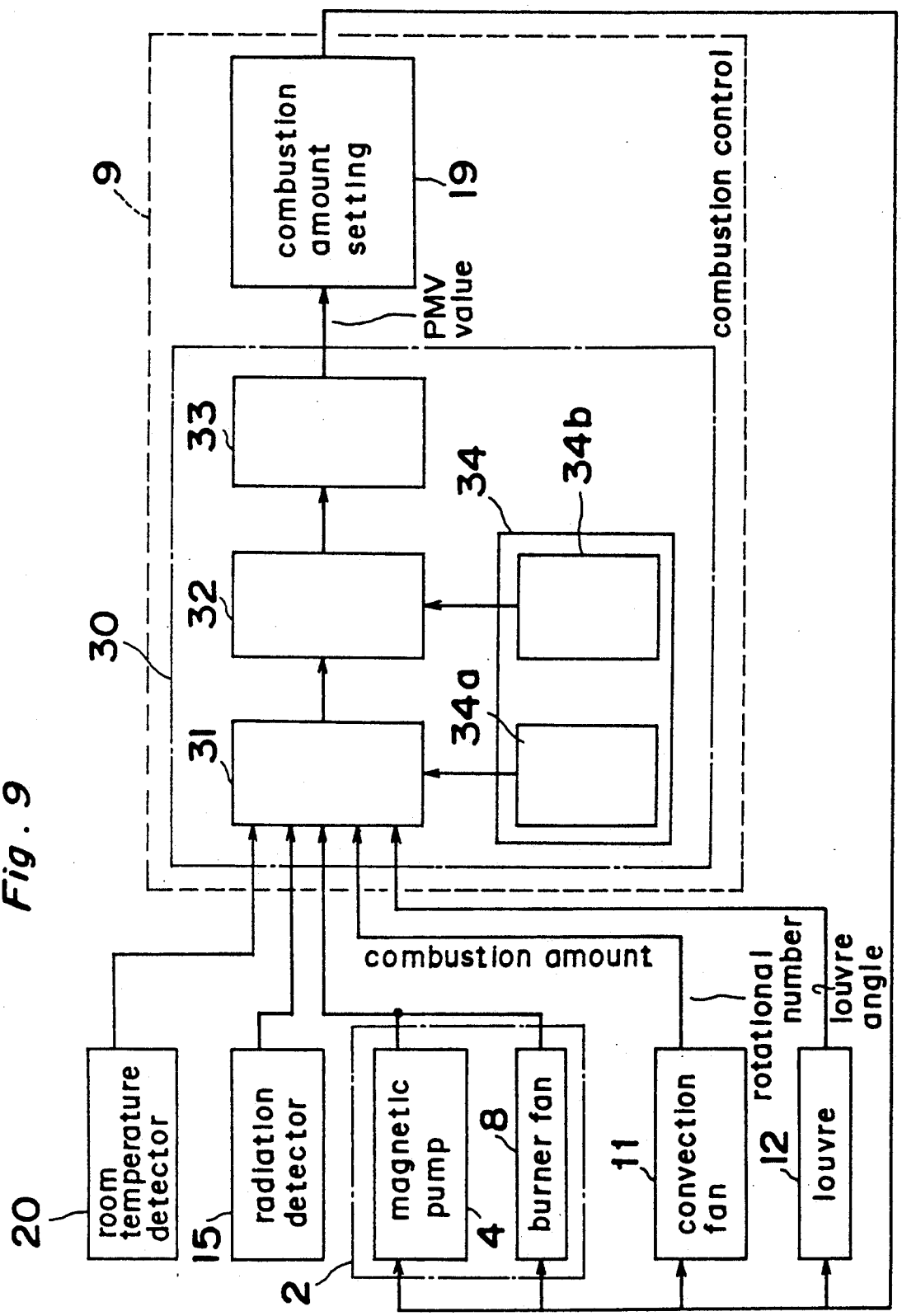

In FIG. 9, the PMV value is obtained through fuzzy inference. That is, the PMV value of a space to be heated is obtained by a fuzzy inference device 30 based on the information from the room temperature detecting part 20, radiation detecting part 15, and the burning level, the rotating frequency of the convection fan 11 and angle of the louver 12.

Figure 10:
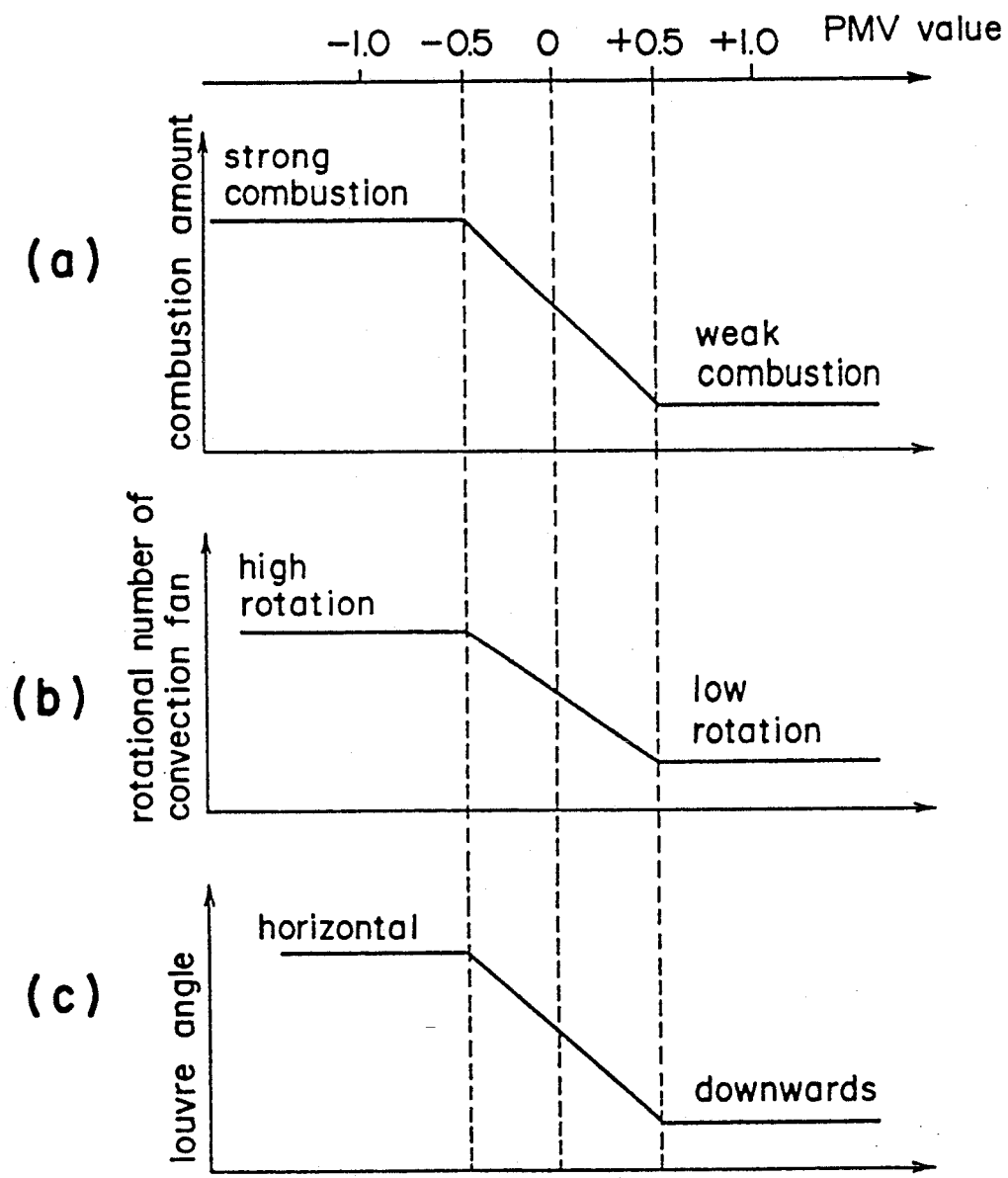
FIGS. 10(a)-10(c) are diagrams explanatory of the operation of the control device of FIG. 9.
Figure 11A:
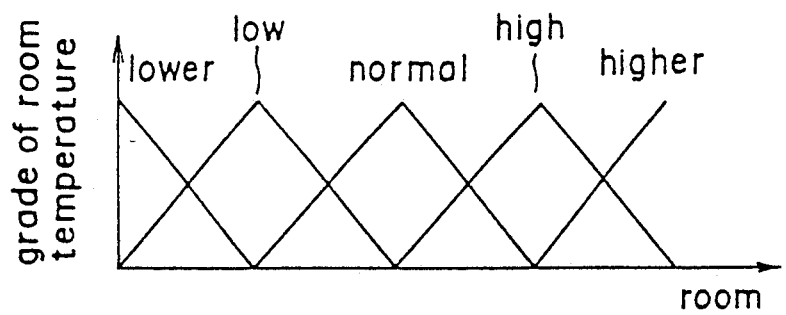
FIGS. 11(a)-11(e) are diagrams of the membership functions of the foreground job of the control device of FIG. 9.
Figure 11B:
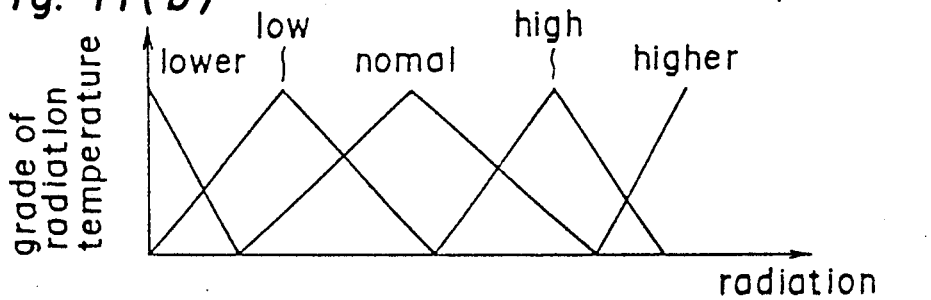
Figure 11C:
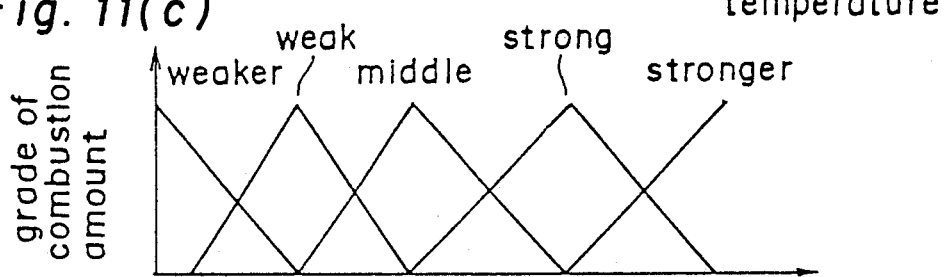
Figure 11D:
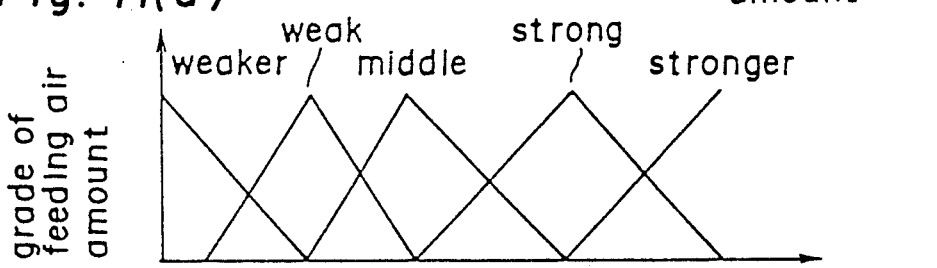
Figure 11E:
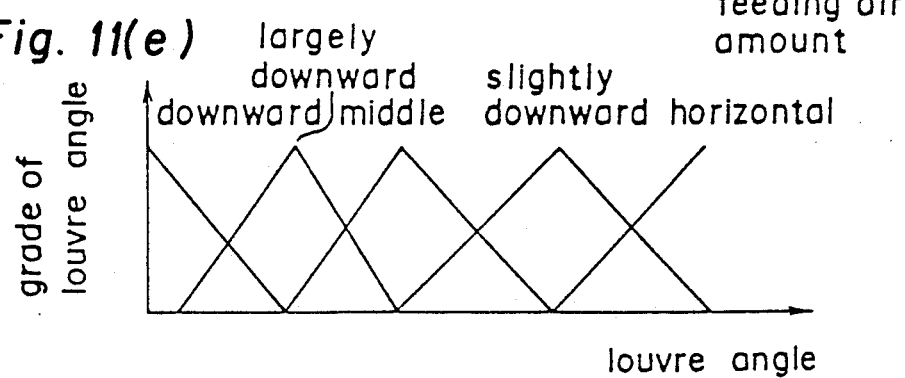
Figure 12:
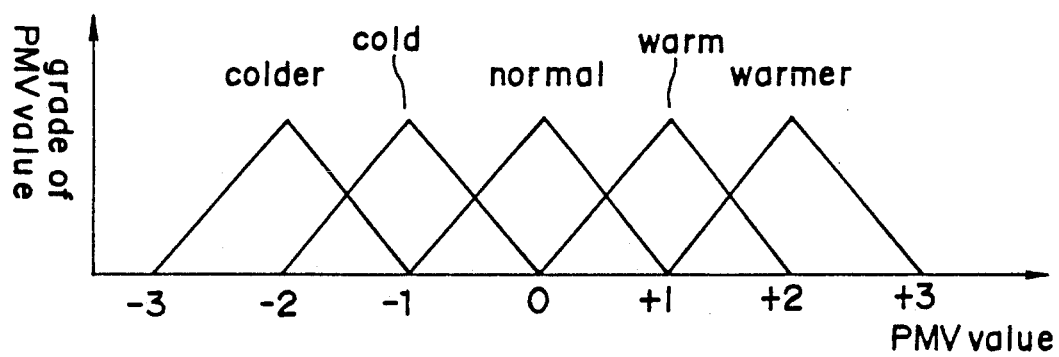
FIG. 12 is a diagram of the membership function of the background job of the control device of FIG. 9.

The burning level setting part 19 controls the burning level in the burning part 2 and air flow of the convection fan 11, and further the angle of the louver 12 in accordance with the PMV value obtained by the above fuzzy inference device 30. As shown in FIGS. 10(a)–10(c), for example, when the PMV value is negative, the burning level is raised and the rotating frequency of the convection fan 11 is increased, with the louver 12 turned approximately horizontal, so that the warm air is sent out to the whole of the room to thereby quickly warm the room including the floor surface and wall surface. In contrast, if the PMV value is positive, the burning level is decreased and the rotating frequency of the convection fan 11 is reduced and also the louver 12 is directed downward. Accordingly, the air is changed to be slow and soft. An increase of the PMV value is restricted.

The fuzzy inference is based on such a rule that "it is regarded relatively cold when the room temperature is low, and the amount of radiation is relatively small, and the burning level is relatively high, and the air flow is relatively strong, and the angle of a variable vane which can change the direction of the air is slightly downward." Each above-described qualitative concept, namely, "low", "relatively small, "relatively high", "relatively strong", "slightly downward" or the like is represented quantitatively by a membership function as indicated in FIGS. 11(a)–11(e) and FIG. 12.

In the fuzzy inference device 30 of FIG. 9, an operating part 31 obtains the degree of fit between the room temperature detected by the room temperature detecting part 20 and a membership function related to the room temperature by detecting the maximum value. Similarly, a predetermined degree of fit is set for each of the amount of radiation of the radiation detecting part 15, burning level of the burning part 2, rotating frequency of the convection fan 11, and angle of the louver 12. Then, a degree of fit of the foreground job is determined by obtaining the minimum of the above five degrees of fit. A weighting/operating part 32 detects and judges the minimum from the degree of fit of the foreground job and a membership function related to the warm/cool feeling of the background job as a conclusion of the rule.

After the weighting/operating part 32 weights the conclusion of each rule, an operating part 33 obtains the maximum of all the conclusions and calculates the gravity of center. In this manner, the PMV value indicating the warm/cool feeling is predicted.

The membership function related to the foreground job, i.e., the room temperature, amount of radiation, burning level, air flow and the angle of the variable vane, and that related to the background job, that is, PMV value (warm/cool feeling) are stored respectively in a foreground memory part 34a and a background memory part 34b. Therefore, the membership function is obtained by referring to the memory parts 34a, 34b. The rule of the inference is obtained by referring to a controlling rule memory part 34 which is comprised of the above foreground memory part 34a and background memory part 34b.

Based on the PMV value determined according to fuzzy inference as depicted hereinabove, the burning level is determined by the burning level setting part 19, and the electromagnetic pump 3, burner fan 8, convection fan 11 and louver 12 are controlled by the burning controlling part 9. The fuzzy inference device 30 and burning controlling part 9 are easily realized by a microcomputer.

Neuro-Fuzzy

Figure 13:
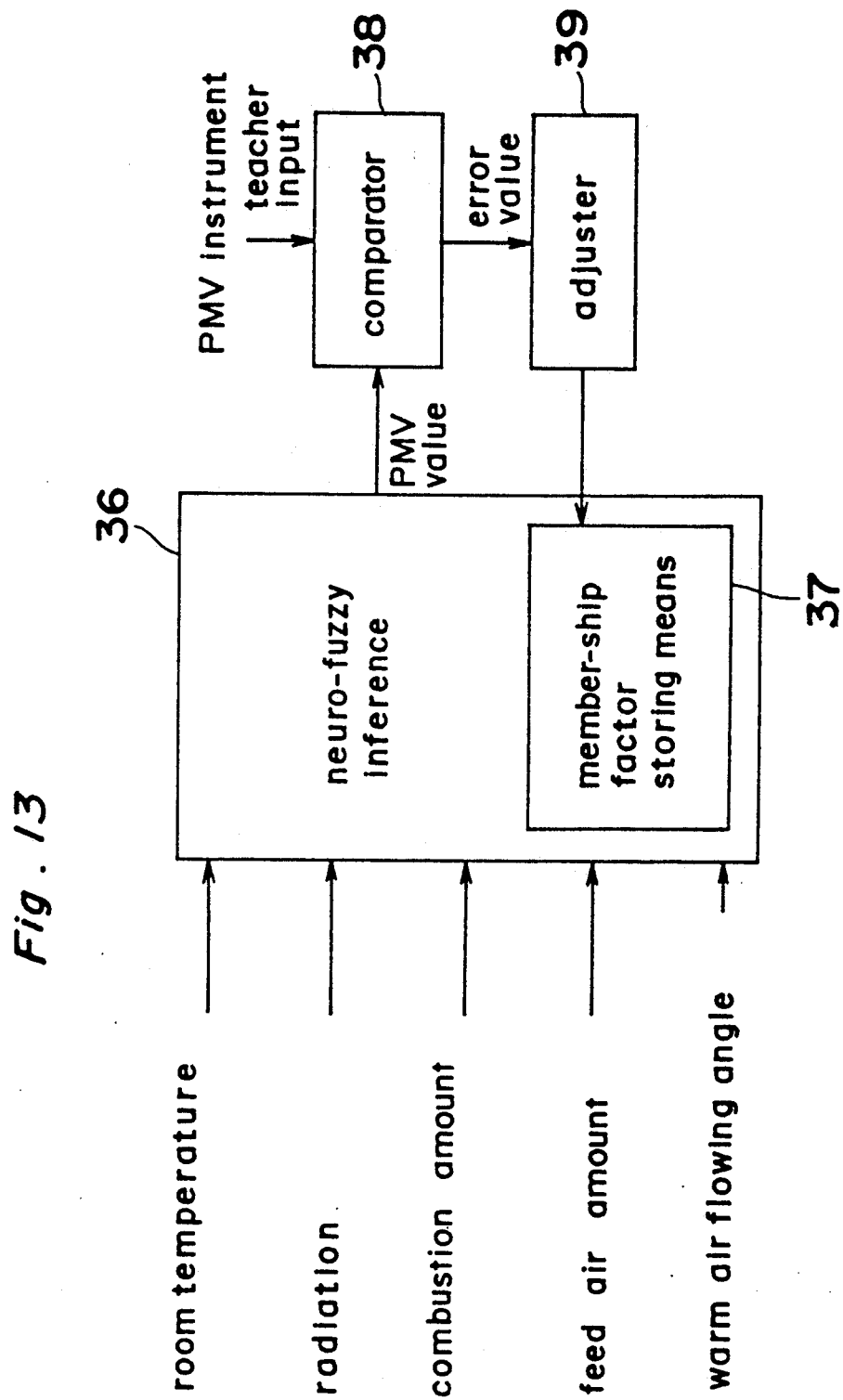
FIG. 13 is a block diagram of a neuro-fuzzy inference device of the control device of FIG. 9.

FIG. 13 is a block diagram of a modified example of a control device, in which the fuzzy inference device 30 of FIG. 9 is replaced with a neuro-fuzzy inference device 36. After a suitable initial value is set in a membership function memory means 37, burning is started and the PMV value of a space to be heated is predicted. The actual PMV value of the space to be heated is measured at this time and input as a teacher's signal. A comparator 38 obtains the difference between the predicted value and teacher's input as an error value. An adjuster 39 adjusts the membership function in accordance with the error value by the most sudden fall method, to thereby make small the error value.

It is possible to automatically construct a parameter of the optimum fuzzy inference if the above adjustment is repeated for various cases of the room temperature, amount of radiation, burning level, air flow and angle of the louver. Among the factors determining the PMV value, the volume of clothes and humidities are set to be representative values of the winter season, and the metabolic quantity is set to be a fixed value for the case of the light work.

Adjusting the membership function means, for example, to adjust the central value or width of the triangular membership function or to adjust a parameter regulating the membership function such as the real value of the background job or the like.

Although the parameter is adjusted while the teacher's data is sequentially input in the instant embodiment, a plurality of data matrices of the fuzzy inference inputs and teacher's inputs may be set beforehand to adjust the parameter at one time.

The most sudden fall method is publicly known as the learning rule in neural network. If this method is used to adjust the parameter for fuzzy inference, the fuzzy inference which has conventionally been done through cut and try process is automated. At the same time, it becomes possible to construct even the fuzzy inference representing too complicated input/output relationship for a user to adjust.

As described above, the volume of clothes and humidities are set to be the representative values of the winter season and the metabolic quantity is set to be a fixed value for the light work in the embodiment of FIG. 13. Even if these values are made changeable by a sensor or an external input means, needless to say, it is possible to construct the fuzzy inference device in the same manner as in the present embodiment. Moreover, if the air heating apparatus is not provided with a louver, the wind velocity, etc. determined by the louver may be set to a suitable fixed value.

Switching Between PMV Control and Room Temperature Control

Figure 14:
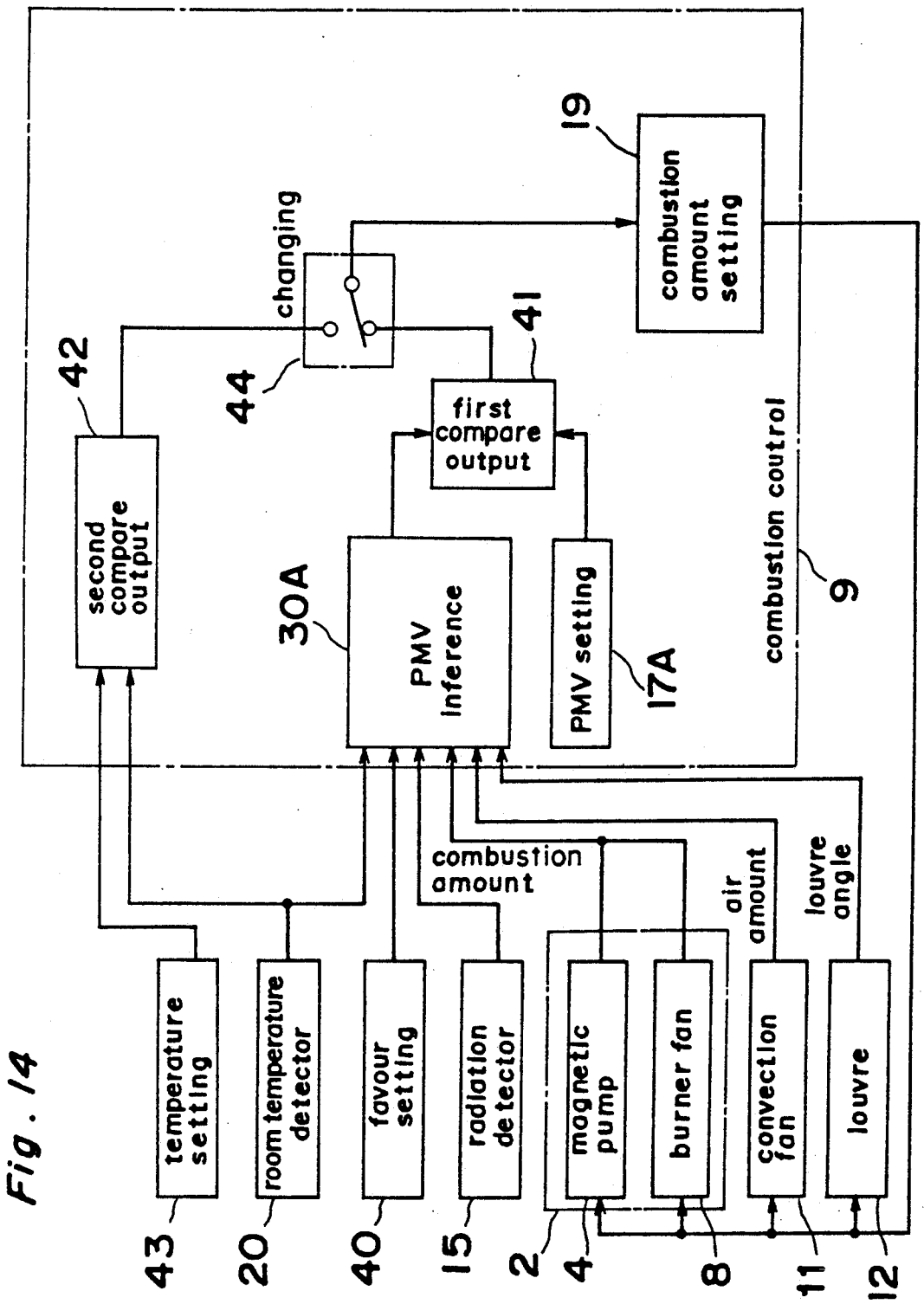
FIG. 14 is a block diagram of a control device of an air heating apparatus according to a further embodiment of the present invention.

A control device of FIG. 14 is capable of switching control between based on the PMV value and based on the room temperature. Although the control device in the foregoing embodiments which controls the PMV value is fit to realize the comfortable environment inside the room for persons, it is unsuitable and lacks in flexibility for such cases that the room temperature is to be controlled low, washing clothes are desired to be quickly dried in the room or to secure suitable environment for ornamental plants. Further, when the parameter of the amount of activity and volume of clothes which give important influences to the PMV value is a fixed value, the controlling correctness is endangered. Moreover, the correlation between the PMV value and comfortable state is not assured according to the parameter adjusting method.

Therefore, the embodiment in FIG. 14 solves the aforementioned problem, making control of the room temperature and that of the PMV value selectable and improving the usage convenience. In FIG. 14, a PMV inference part 30A receives inputs of the room temperature detected by the room temperature detecting part 20, the amount of radiation of the radiation detecting part 15, a value designated by a preference setting part 40 toward the hot or cold air, etc., the burning level of the burning part 2, the air flow of the convection fan 11 and the angle of louver 12, thereby to infer the PMV value. The PMV value setting part 17A sets the PMV value to be 0 beforehand. A first comparing/outputting part 41 makes comparison between the outputs of the PMV inference part 30A and PMV setting part 17A, and outputs a burning controlling signal to lessen the deviation between the above outputs. In other words, when the PMV value is larger than 0, the first comparing/outputting part 41 outputs such a controlling signal that reduces the burning level, whereas, when the PMV value is smaller than 0, the first comparing/outputting part 41 controls to increase the burning level. A second comparing/outputting part 42 compares the temperature detected by the room temperature detecting part 20 with the set temperature set by a temperature setting part 43, to thereby output a burning controlling signal to reduce the temperature difference. That is, when the room temperature is higher than the set temperature, the second comparing/outputting part 42 generates a burning controlling signal to decrease the burning level. On the other hand, if the room temperature is lower than the set temperature, the part 42 generates the controlling signal to increase the burning level.

A switching part 44 switches the PMV control mode and the room temperature control mode by selecting information connected to the burning level setting part 19. In the PMV control mode, the first comparing/outputting part 41 is selected. The second comparing/outputting part 42 is selected in the room temperature control mode.

Figure 15:
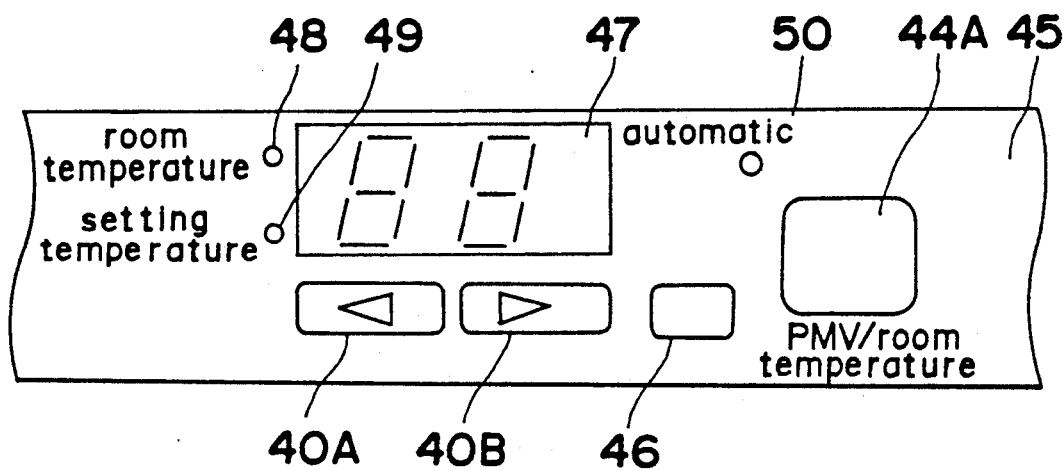
FIG. 15 is a front elevational view of a display part of the control device of FIG. 14.

FIG. 15 indicates the structure of a manipulation/display part 45. The manipulation/display part 45 has switches 40A, 40B, 46, a digital display part 47 and lamps 48, 49, 50. The room temperature, set temperature, desired PMV value, etc. are set by manipulation of the switches 40A, 40B. The switch 46 is used to switch to digital display. Lamps 48, 49, 50 indicate the display mode. A switch 44A of the switching part 44 is to switch between the PMV control mode and the room temperature control mode. When the PMV control mode is selected, the information displayed by the switches 40A, 40B is input to the preference setting part 40. When the room temperature control mode is selected, the same information is input to the temperature setting part 43. The selected mode is distinguished by the lamp 50.

Figure 16:
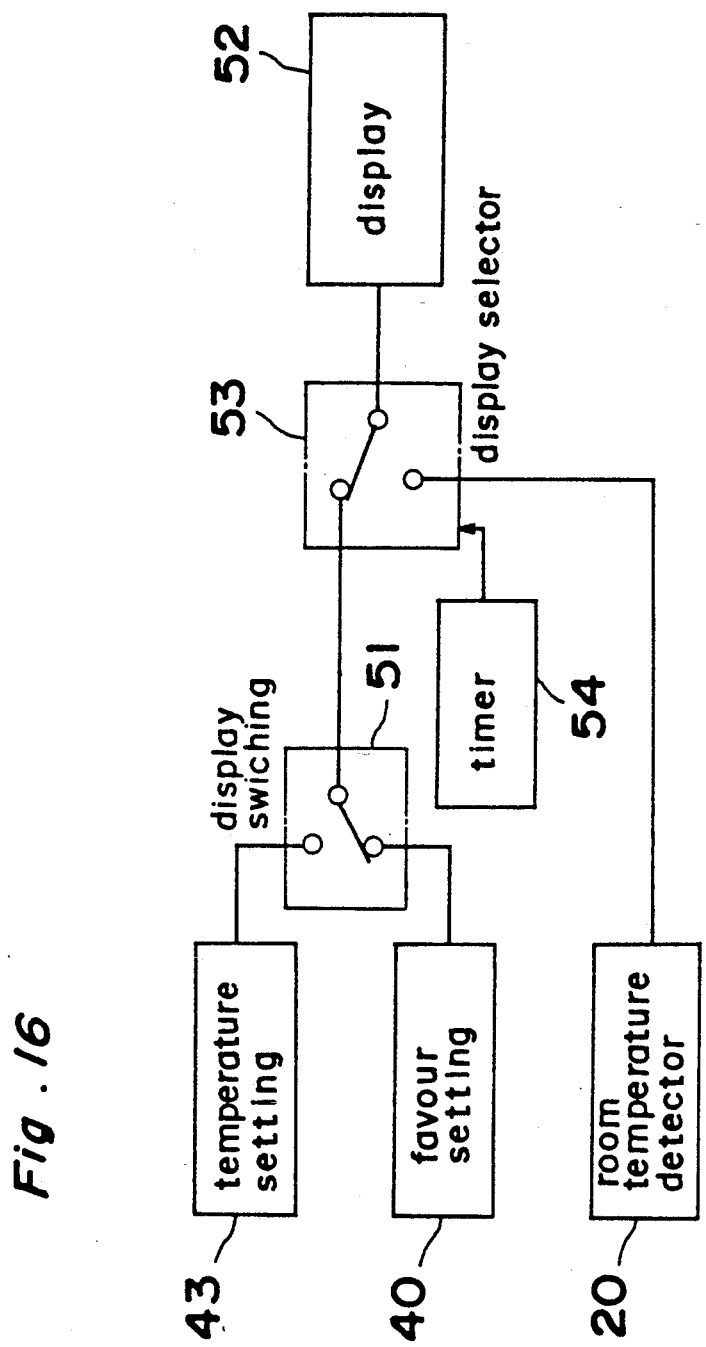
FIG. 16 is a structural block diagram of the display part of the control device of FIG. 14.

FIG. 16 is a structural block diagram of the display part. A display switching part 51 interlocks with the switch 44A to switch the information to be output to a display part 52 between the set temperature and preference setting value. Further, a display selecting part 53 interlocks with the display switching switch 46 to select the set temperature or preference setting value, and the room temperature. In the PMV control mode, the time while the display selecting part 53 displays the room temperature is restricted to a predetermined time, for example, five seconds by a timer 54. The display part 52 is comprised of the digital display part 47 which displays the room temperature, set temperature and preference value, lamp 48 which is turned ON when the room temperature is indicated by the digital display part 47, lamp 49 which is turned ON when the set temperature is displayed and lamp 50 which is turned ON when the PMV control mode is selected.

Although the PMV inference part 30A may be constructed in neural network, the inference part 30 of this embodiment performs fuzzy inference similar to the one in FIG. 9. That is, the PMV value is predicted and output from the inputs of the room temperature, amount of radiation, burning level, air flow, angle of the louver, preference value and humidities. The relation between the above room temperature, amount of radiation, burning level, air flow, angle of the louver, preference value and fixed value as the membership function and the PMV value is described by the inference rule, and processed according to the fuzzy inference. The humidities are set to 40% RH which is a typical value at an office and inside the room of a house in winter. Since the volume of clothes and activity differs depending on the age, sex, living environment or the like of people, it is represented by the value input as the preference.

In the above-described structure, at the initial stage of driving when the power switch is turned ON, the PMV control mode is automatically effected, and the switching part 44 is connected to the comparing/outputting part 41, while the display switching part 51 is connected to the preference setting part 40, with the lamp 50 lighted. In this state, since the switching part 44 is connected to the comparing/outputting part 41, as the air heating apparatus is driven, the deviation of the PMV value predicted from the current room temperature, temperature of the wall surface and floor surface, etc. inside the room and the burning level from the value set in the PMV setting part 17A is input to the burning level setting part 19. Accordingly, the burning level is determined irrespective of the set temperature.

However, if one feels cold, wears scanty clothing or it is immediately after one takes a bath or during sleeping, the burning level is greatly shifted from the value set when the amount of clothes and activity is standard. Therefore, it becomes necessary to change the preference value by manipulating the switch 40A or 40B. At the time of the PMV control mode, the display switching part 51 is connected to the preference setting part 40 and the display selecting part 53 is connected to the display switching part 51. Therefore, if the content of the preference setting part 40 is changed through the switch 40A or 40B, the changed content is output to the display part 52. Since it is sometimes required even in the PMV control mode to confirm what is the room temperature, in such case, the display selecting part 53 is switched to the side of the room temperature detecting part 20 upon depression of the display switching switch 46. Thus, the current room temperature is displayed. The timer 54 is actuated at this time. The display selecting part 53 is switched from the room temperature detecting part to the display switching part 51 five seconds later, and the preference value is indicated.

In the meantime, if there are plants inside the room or the room temperature is desired to be raised so as to use the room as a drying, room, or when the room should not be cold although people have gone out for a while, the PMV control mode is changed to the room temperature control mode when the switch 44A is depressed. As a result, the display switching part 51 is connected to the side of the temperature setting part 43 and the display selecting part 53 is connected to the side of the room temperature detecting part 20. The set temperature is displayed at the digital display part 47 through depression of the switch 40A, 40B, and the content of the temperature setting part 43 is changed. Since the burning level in the burning level setting part 19 is determined by the output from the second comparing/outputting part 42, the room temperature is agreed to the set temperature. Accordingly, the room temperature can be set high or low.

In the manner as above, it becomes possible to obtain a comfortable environment centering the PMV value, to set the room temperature freely in accordance with the usage purpose, and moreover, to simplify the structure of the switches and display part, thereby improving the usage convenience remarkably.

Figure 17:
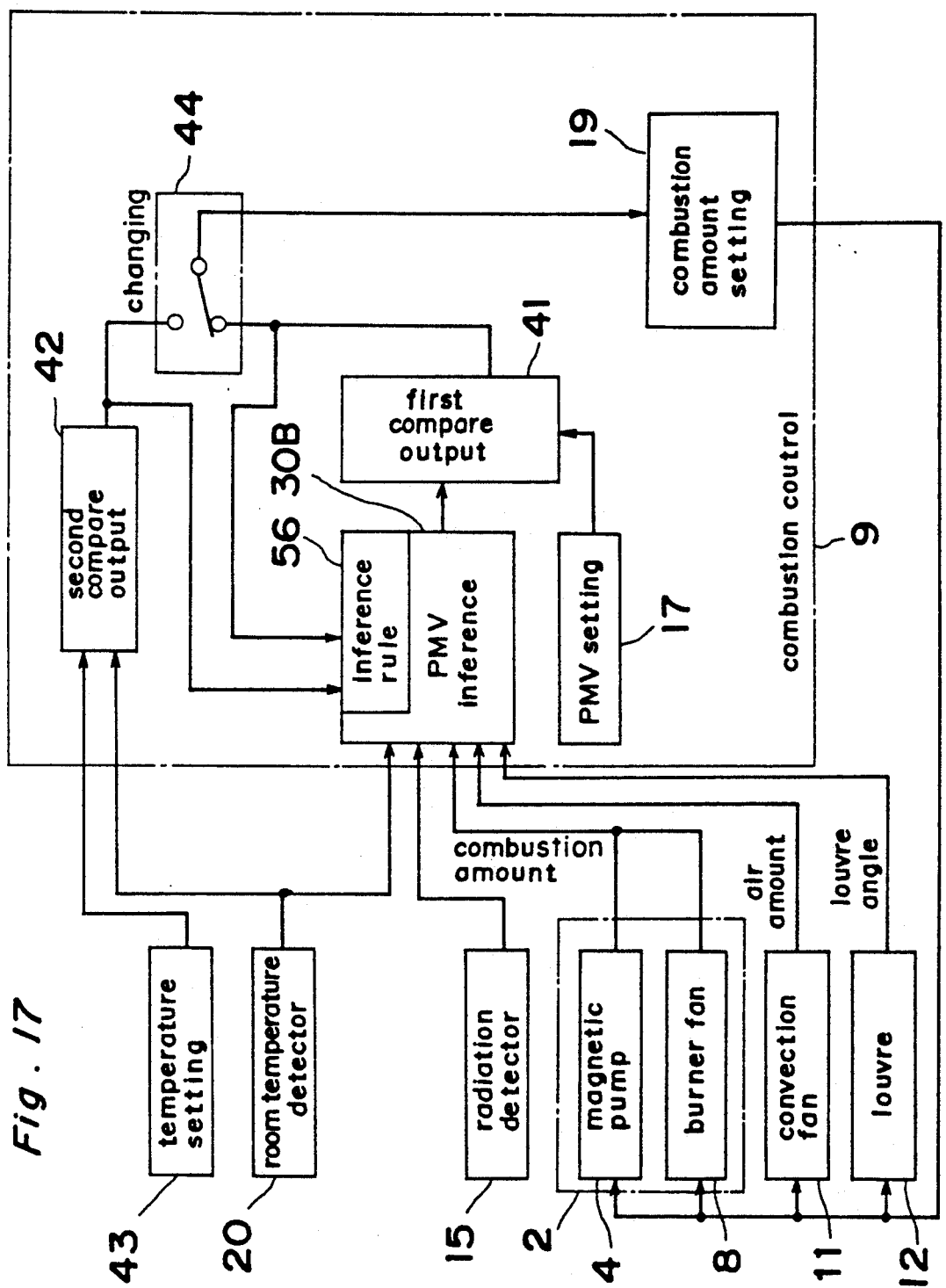
FIG. 17 is a block diagram of a control device of an air heating apparatus according to a still further embodiment of the present invention.
Figure 18:
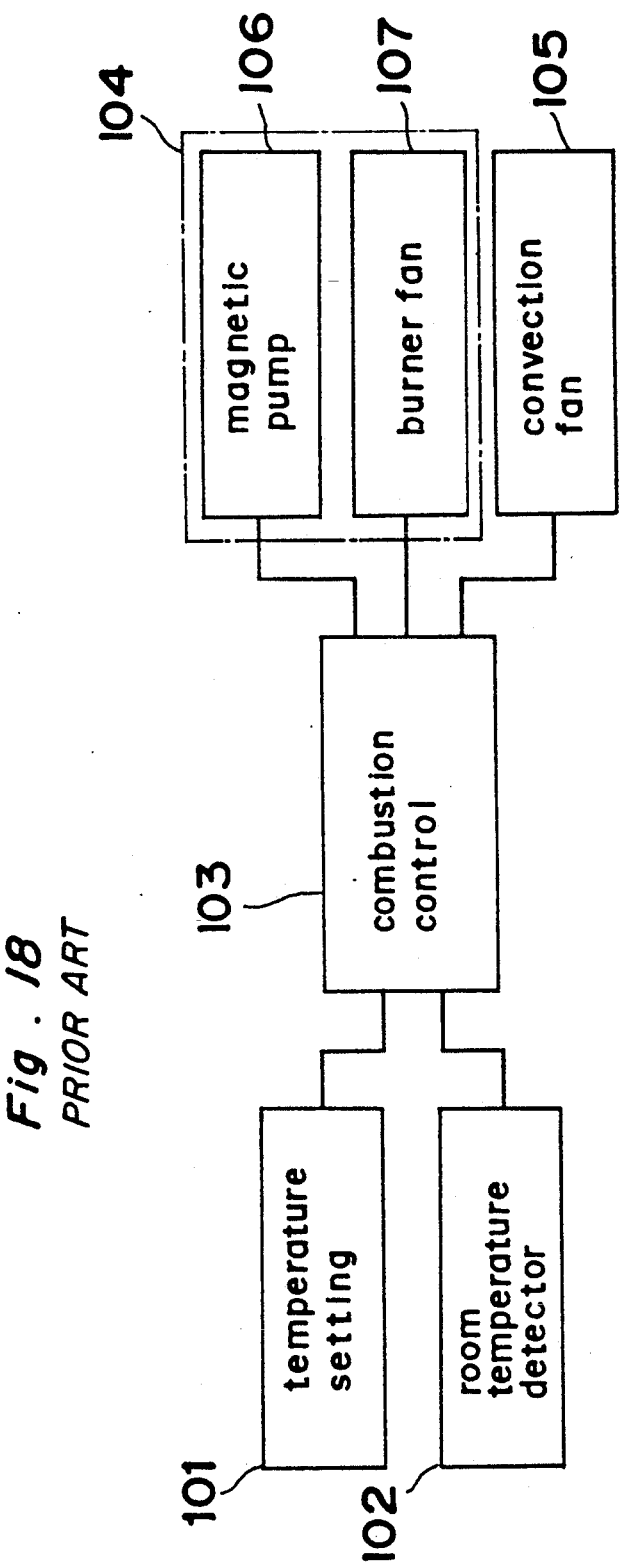
FIG. 18 is a block diagram of a control device of a conventional air heating apparatus.

Although the preference setting part 19 is provided hereinabove so as to correct the volume of clothes and activity to obtain the PMV value in conformity with the actual feeling, now, a different embodiment will be depicted with reference to FIG. 17. In FIG. 17, the usage state is learned from the information in the room temperature control mode. The same parts as in FIG. 14 are designated by the same reference numerals in FIG. 17, the description of which will be abbreviated here.

A PMV inference part 30B is provided with a membership function corresponding to the inputs of the room temperature, amount of radiation, burning level, air flow, angle of the louver and humidities, a membership function representing the state of people such as "inclined to feel too hot", "inclined to feel too cold" or the like which is tuned beforehand, and an inference rule to describe the correlation between the membership function and PMV value. The PMV inference part 30B processes and outputs the PMV value through fuzzy inference. An inference rule part 56 stores the membership functions and inference rule. The humidity is a fixed value, and the initial values of the membership functions and inference rule are those set when the volume of clothes is 1.0 clo, and the amount of activity is 1.2 met. The outputs of the comparing/outputting parts 41, 42 are input to the switching part 44 and further to the PMV inference part 30B to be used when the content of the inference rule part 56 storing the membership functions and inference rule is updated.

According to the room temperature control mode, the burning level is controlled by the output of the comparing/outputting part 42, and the room temperature is rendered stable around the set temperature. At this time, the current PMV value is inferred in the comparing/outputting part 41, so that the deviation of the PMV value from when the PMV=0 is output. The membership functions and inference rule in the inference rule part 56 are changed so that the outputs of the comparing/outputting parts 42, 41 are agreed with each other while the output of the comparing/outputting part 42 is used as a teacher's signal. The preference of the user can be accordingly reflected in the PMV control mode. The membership functions and inference rule are updated every predetermined interval by a built-in timer of the PMV inference part 30B. On the other hand, the inference rule part 56 is not updated in the PMV control mode, but the PMV value is inferred based on the membership functions and inference rule updated in the room temperature control mode. Therefore, if the PMV control mode is selected after the content of the inference rule part 56 is once updated according to the preference of the user in the room temperature control mode, the user's desired environment can be realized, that is, the room temperature is lowered if the radiation temperature is increased due to solar beams, or the room temperature is controlled a little higher in the case of the cold radiation.

As is clear from the foregoing description of the present invention, the air heating apparatus performs control of the temperature with taking the amount of radiation into consideration. Or, the air heating apparatus predicts the PMV value of a space to be heated on the basis of the information, e.g., the amount of radiation from the wall surface or the like of the space to be heated, burning level in the burning part, and air flow from the convection fan, etc., thereby controlling the burning level, rotating frequency of the convection fan, etc. and changing the PMV value close to 0. Therefore, heating is controlled in the neutral state, neither too hot, nor too cold, in the thermally balanced state. The degree of comfort is increased much more.

Since the air heating apparatus controls based on the above PMV value which is operated from the output of the radiation detecting part, it is not necessary to set the temperature, and wasteful manipulation is avoided.

Moreover, since the amount of radiation detected by the radiation detecting part is arranged to be corrected, correct controlling is enabled. The PMV value is changed in accordance with the preference of people and burning is temporarily stopped when the PMV value is outside a predetermined value. Therefore, people can enjoy more comfortable heating.

In addition, it is possible to select control between on the basis of the PMV value and on the basis of the set temperature, so that the optimum heating is achieved in accordance with the preference of the user or usage purpose. The air heating apparatus of the present invention is very convenient in use.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An air heating apparatus comprising
a burning means,
a room temperature detecting means which detects a room temperature,
a radiation detecting means which detects the amount of radiation from a surface of a room to be heated,
a convection fan for sending warm air into the room,
an operating means which generates a control signal on the basis of outputs from said room temperature detecting means and radiation detecting means, a burning amount output of said burning means and an air amount output of said convection fan, and
a burning amount setting means which controls the burning amount of said burning means and the air amount of said convection fan so that the output from said operating means becomes a predetermined value.

2. An air heating apparatus comprising
a burning means,
a temperature setting means which sets a room temperature,
a room temperature detecting means which detects the room temperature,
a radiation detecting means which detects the amount of radiation from a surface of a room to be heated,
a convection fan for sending warm air into the room,
an operating means which generates a control signal on the basis of outputs from said room temperature detecting means and radiation detecting means, a burning amount output of said burning means and an air amount output of said convection fan,
a burning amount setting means which controls the burning amount of said burning means and the air amount of said convection fan so that the output from the operating means becomes a predetermined value or so that the output from the room temperature detecting means becomes a temperature which is not set at said temperature setting means, and
a switching means which switches information to be output to said burning amount setting means to either one of the outputs from said operating means and room temperature detecting means.

3. An air heating apparatus according to claim 1 or 2, which further comprising a correcting temperature detecting means which detects the temperature in the vicinity of said radiation detecting means, and a radiation amount correcting means which corrects the output of said radiation detecting means upon receipt of outputs from said room temperature detecting means and correcting temperature detecting means, wherein the output of said radiation amount correcting means is input to said operating means.

4. An air heating apparatus according to claim 1 or 2, wherein a comparing/outputting means is provided to detect whether the output of said operating means is within an aimed controlling value, thereby generating an output to said burning amount setting means, characterized in that burning of said burning means is stopped when the aimed controlling value from said operating means is outside a predetermined value.

5. An air heating apparatus according to claim 3, wherein a comparing/outputting means is provided to detect whether the output of said operating means is within an aimed controlling value, thereby generating an output to said burning amount setting means, characterized in that burning of said burning means is stopped when the aimed controlling value from said operating means is outside a predetermined value.

6. An air heating apparatus comprising: 'a burning means,
a room temperature detecting means which detects a room temperature,
a radiation detecting means which detects the amount of radiation from a surface of a room to be heated,
a convection fan for sending warm air into the room,
a PMV operating means for outputting a PMV value, which denotes a fitting characteristic of a heating condition of the room to be heated, on the basis of a burning amount output from said burning means, the output from said room temperature detecting means, the output from said radiation detecting means and an output of the rotational number of said convection fan, and
a burning control means which controls the burning amount of said burning means and the air amount of said convection fan so that the PMV value output by said PMV operating means becomes a predetermined PMV value.

7. An air heating apparatus comprising:
a burning means,
a room temperature setting means which sets a room temperature,
a room temperature detecting means which detects the room temperature,
a radiation detecting means which detects the amount of radiation from a surface of a room to be heated,
a PMV operating means for outputting a PMV value, which denotes a fitting characteristic of a heating condition of the room to be heated, on the basis of outputs from said room temperature detecting means and radiation detecting means, a burning amount output from said burning means and an output of a rotational number of said convection fan,
a burning amount setting means which controls said burning means or convection fan so that the PMV value operating means becomes a predetermined value or so that the output from said room temperature detecting means becomes a temperature which is not set at said temperature setting means, and
a switching means which switches the information to be input to said burning amount setting means to either of the outputs from said PMV operating means or from said room temperature detecting means.

8. An air heating apparatus according to claims 6 or 7, further comprising a correcting temperature detecting means which detects the temperature in the vicinity of said radiation detecting means, and a radiation amount correcting means which corrects the output from said radiation detecting means upon receipt of outputs from said room temperature detecting means and correcting temperature detecting means and the burning amount in said burning means, wherein the output of said radiation amount correcting means is input to said PMV operating means.

9. An air heating apparatus according to claims 6 or 7, further comprising a comparing/outputting means which compares the PMV value from said PMV operating means with a PMV value from a PMV setting means to output a corresponding predetermined control signal to said burning amount setting means, and a PMV correcting means which changes the PMV value of said PMV setting means, so that the corrected PMV value from said PMV correcting means is made the PMV value of said PMV setting means.

10. An air heating apparatus according to claim 6 or 7, wherein a comparing/outputting means is further provided to detect whether or not the output from said PMV operating means is within a predetermined value, whereby burning in said burning means is stopped by the output of said comparing/outputting means when the PMV value from said PMV operating means is outside the predetermined value.

11. An air heating apparatus according to claim 6 or 7, wherein a PMV display means is further provided to make a predetermined style of display on the basis of the PMV value of said PMV operating means.

12. An air heating apparatus according to claim 6 or 7, wherein said PMV operating means is constituted of a fuzzy inference device which outputs the PMV value upon receipt of inputs denoting at least one of an operating state of said apparatus and a heating condition of the room to be heated.

13. An air heating apparatus according to claim 6 or 7, wherein said PMV operating means is constituted of a neutral network which outputs the PMV value upon receipt of inputs denoting at least one of an operating state of said apparatus and a heating condition of the room to be heated.

14. An air heating apparatus according to claim 8, further comprising a comparing/outputting means which compares the PMV value from said PMV operating means with a PMV value from a PMV setting means to output a corresponding predetermined control signal to said burning amount setting means, and a PMV correcting means which changes the PMV value of said PMV setting means, so that the corrected PMV value from said PMV correcting means is made the PMV value of said PMV setting means.

15. An air heating apparatus according to claim 8, wherein a comparing/outputting means is further provided to detect whether or not the output from said PMV operating means is within a predetermined value, whereby burning in said burning means is stopped by the output of said comparing/outputting means when the PMV value from said PMV operating means is outside the predetermined value.

16. An air heating apparatus according to claim 9, wherein a comparing/outputting means is further provided to detect whether or not the output from said PMV operating means is within a predetermine value, whereby burning in said burning means is stopped by the output of said comparing/outputting means when the PMV value from said PMV operating means is outside the predetermined value.

17. An air heating apparatus according to claim 8, wherein a PMV display means is further provided to make a predetermined style of display on the basis of the PMV value of said PMV operating means.

18. An air heating apparatus according to claim 9, wherein a PMV display means is further provided to make a predetermined style of display on the basis of the PMV value of said PMV operating means.

19. An air heating apparatus according to claim 10, wherein a PMV display means is further provided to make a predetermined style of display on the basis of the PMV value of said PMV operating means.

20. An air heating apparatus according to claim 8, wherein said PMV operating means is constituted of a fuzzy inference device which outputs the PMV value upon receipt of inputs denoting at least one of an operating state of said apparatus and a heating condition of the room to be heated.

21. An air heating apparatus according to claim 9, wherein said PMV operating means is constituted of a fuzzy inference device which outputs the PMV value upon receipt of inputs denoting at least one of an operating state of said apparatus and a heating condition of the room to be heated.

22. An air heating apparatus according to claim 10, wherein said PMV operating means is constituted of a fuzzy inference device which outputs the PMV value upon receipt of inputs denoting at least one of an operating state of said apparatus and a heating condition of the room to be heated.

23. An air heating apparatus according to claim 11, wherein said PMV operating means is constituted of a fuzzy inference device which outputs the PMV value upon receipt of inputs denoting at least one of an operating state of said apparatus and a heating condition of the room to be heated.

24. An air heating apparatus according to claim 8, wherein said PMV operating means is constituted of a neutral network which outputs the PMV value upon receipt of inputs denoting at least one of an operating state of said apparatus and a heating condition of the room to be heated.

25. An air heating apparatus according to claim 9, wherein said PMV operating means is constituted of a neutral network which outputs the PMV value upon receipt of inputs denoting at least one of an operating state of said apparatus and a heating condition of the room to be heated.

26. An air heating apparatus according to claim 10, wherein said PMV operating means is constituted of a neutral network which outputs the PMV value upon receipt of inputs denoting at least one of an operating state of said apparatus and a heating condition of the room to be heated.

27. An air heating apparatus according to claim 11, wherein said PMV operating means is constituted of a neutral network which outputs the PMV value upon receipt of inputs denoting at least one of an operating state of said apparatus and a heating condition of the room to be heated.

* * * * *